United States Patent [19]

Piccirilli et al.

[11] Patent Number: 4,569,966

[45] Date of Patent: Feb. 11, 1986

[54] POLYMERIC MICROPARTICLES

[75] Inventors: Robert M. Piccirilli; David T. McKeough; Wen-Hsuan Chang, all of Gibsonia, Pa.

[73] Assignee: PPG Industries, Inc., Pittsburgh, Pa.

[21] Appl. No.: 602,048

[22] Filed: Apr. 19, 1984

[51] Int. Cl.$^4$ .................. C08G 22/08; C09D 3/72
[52] U.S. Cl. ................................ 524/589; 524/590; 524/539; 525/440; 525/127; 428/413; 428/423.1; 428/457; 428/482; 428/425.3; 428/460; 428/409; 428/427; 428/410; 428/411.1
[58] Field of Search ............... 524/589, 590, 539; 525/440, 127; 428/413, 423.1, 457, 482, 425.3, 460, 409, 427, 410, 407.1

[56] References Cited

U.S. PATENT DOCUMENTS

| | | | |
|---|---|---|---|
| 3,317,635 | 5/1967 | Osmond | 525/296 |
| 3,717,605 | 2/1973 | Osmond et al. | 524/533 |
| 3,748,294 | 7/1973 | Korshaw et al. | 524/590 |
| 4,147,688 | 4/1979 | Makhlouf et al. | 524/461 |
| 4,290,932 | 9/1981 | Wright et al. | 524/522 |
| 4,425,468 | 1/1984 | Makhlouf et al. | 524/710 |

FOREIGN PATENT DOCUMENTS 967051  8/1964  United Kingdom .

OTHER PUBLICATIONS

"PHD Polyols, A New Class of PUR Raw Materials", Journal of Cellular Plastics, Jan./Feb. 1981, pp. 43–50.

*Primary Examiner*—John Kight
*Assistant Examiner*—M. L. Moore
*Attorney, Agent, or Firm*—William J. Uhl

[57] ABSTRACT

Polymeric microparticles and dispersions of polymeric microparticles in a liquid hydrocarbon are disclosed. The dispersions are prepared by reacting in dispersed form a preformed NCO-prepolymer containing a segment solvated by the liquid hydrocarbon and a segment insoluble in the liquid hydrocarbon with an active hydrogen-containing compound. Reaction proceeds to form polymeric microparticles which are dispersed in the liquid hydrocarbon. Also disclosed are the use of the polymeric microparticles in coating compositions and articles coated with the coating compositions.

19 Claims, No Drawings 4,569,966

POLYMERIC MICROPARTICLES

BACKGROUND OF THE INVENTION

1. Field of the Invention

The present invention relates to polymeric microparticles and to non-aqueous dispersions of polymeric microparticles, particularly polymeric microparticles containing urethane linkages and to their use in coating compositions.

2. Brief Description of the Prior Art

Microgels are polymeric particles of colloidal dimensions, about 0.001 to 10 microns in diameter, which are prepared by dispersion polymerization techniques. Microgels are used in coating compositions where they improve the rheology of the coating composition and the properties of the resultant cured coating. Specifically, microgel improves the spraying efficiency of the coating composition enabling complete coverage in fewer passes of the spray gun. Microgel also improves the sag resistance of the coating and the metallic pigment pattern control of the coating composition using metallic pigments such as aluminum flake.

As has been mentioned above, microgels and their method of preparation are known in the art. British Pat. No. 967,051 and U.S. Pat. No. 4,290,932 disclose processes for preparing microgel in which a mixture of vinyl monomers, at least one of which contains at least two ethylenically unsaturated double bonds, is polymerized via aqueous emulsion polymerization techniques to form a crosslinked polymer in microparticle form.

U.S. Pat. No. 3,317,635 discloses non-aqueous dispersions of polymers which are prepared by polymerizing in an organic liquid, ethylenically unsaturated monomers which are soluble in the organic liquid but in which the resulting polymer is insoluble. Polymerization is conducted in the presence of a polymeric stabilizer which contains a segment solvated by the organic liquid and an unsaturated group attached to the polymer chain by a primary chemical bond. An example of this primary chemical bond would be the reaction of a hydroxyl group in the polymeric chain and an NCO group associated with the unsaturated group. For example, the stabilizer could be a copolymer of tertiary-butyl methacrylate and ethylene glycol monomethacrylate. This would then be reacted with allyl isocyanate. The stabilizer is then used in the polymerization reaction as described above. There is no disclosure in the reference of reacting NCO-prepolymers with an active hydrogen-containing material to form dispersions of polymeric microparticles.

U.S. Pat. No. 3,717,605 is similar to U.S. Pat. No. 3,317,635 mentioned above in that it also relates to non-aqueous dispersion of polymers in which ethylenically unsaturated monomers are polymerized in an organic liquid in the presence of polymeric stabilizer. The stabilizer is formed from reacting compound A with compound B, with compound A being solvatable by the organic liquid and compound B not being solvatable by the organic liquid and having a different polarity from compound A, and which contains a group capable of condensation reaction with compound A. The co-reactive groups in compounds A and B can be those which form urethane linkages such as isocyanate and hydroxyl groups. Once again, there is no disclosure in the reference of reacting a preformed NCO-prepolymer with active hydrogen-containing materials to form dispersions of polymeric microparticles.

U.S. Pat. No. 3,748,294 relates to polyurethane microgels which are prepared by reacting a polyisocyanate and a polyhydroxy precursor wherein the reaction is carried out in an inert organic liquid in which the polyisocyanate and polyhydroxy precursor are essentially soluble. An example of a polyisocyanate would be a compound and optionally a polymeric compound having attached thereto two or more reactable isocyanate groups. Examples are 2,4-toluene diisocyanate and condensates thereof comprising 3 or more isocyanate groups. An example of the polyhydroxy precursor would be condensates of various fatty acid esters of polyols such as pentaerythritol, for example, pentaerythritol-12-hydroxystearic acid condensates. The polyisocyanate and the polyhydroxy precursor are polymerized under conditions to form the crosslinked polymer which is dispersed in particulate form in the organic liquid. There is no disclosure in the reference, however, of reacting in dispersed form a preformed NCO-containing prepolymer which contains a segment solvated by the organic liquid with an active hydrogen-containing material to form dispersed polymeric microparticles.

In the JOURNAL OR CELLULAR PLASTICS, January/February 1981, reference is made to PHD polyols, an abbreviation of the German "polyharnstoff dispersion". PHD polyols consist of particles of polyurea dispersed in a polyether polyol. These dispersions are not prepared with a preformed NCO-prepolymer and are not dispersed in a liquid hydrocarbon.

U.S. Pat. No. 4,425,468 deals with poly(urea-urethane) dispersions. In this patent, a polyisocyanate is reacted with a polyfunctional amine in the presence of a polyol free of ethylenic unsaturation. Reaction is conducted in the presence of a diluent such as an ethylenically unsaturated compound such as methyl methacrylate, and an active hydrogen-containing polymerizable ethylenically unsaturated compound such as hydroxyethyl methacrylate. A polymerizable ethylenically unsaturated urea-urethane polymer dispersed in a polymerizable ethylenically unsaturated compound is formed. There is no disclosure in the reference of reacting a preformed NCO-containing prepolymer with an active hydrogen-containing compound having a functionality greater than or equal to 2, nor of forming dispersions in liquid hydrocarbons.

U.S. Pat. No. 4,147,688 discloses a method for preparing acrylic microgels and the use of these microgels in coating compositions. Although the acrylic microgels provide excellent sag resistance with acrylic coating compositions, they are not as effective in this respect with compositions derived from condensation polymers such as polyesters and polyurethanes. In accordance with the present invention, it has been found that a certain class of polyurethane microparticles provide excellent sag resistance for coating compositions based on condensation polymers such as polyesters and polyurethanes.

SUMMARY OF THE INVENTION

In accordance with the present invention, polymeric microparticles and non-aqueous dispersions of polymeric microparticles in a liquid hydrocarbon are provided. The microparticles are prepared by reacting in dispersed form a preformed NCO-prepolymer which contains a segment solvated by the liquid hydrocarbon and a segment insoluble in the liquid hydrocarbon with an active hydrogen-containing compound having a functionality of at least 2 to form polymeric microparticles dispersed in the liquid hydrocarbon.

The invention also provides for coating compositions comprising a film-forming polymer in combination with the polymeric microparticles and to coated articles comprising a substrate and adhered thereto a cured coating composition containing the polymeric microparticles.

DETAILED DESCRIPTION

The NCO-prepolymer is formed by reacting an organic polyisocyanate and a polyol component. The NCO-prepolymer contains a segment which is solvated by a liquid hydrocarbon and a segment which is not solvated by the liquid hydrocarbon. Preferably, the solvatable segment is in the polyol component.

The dispersing liquid is one which is inert to the reaction and preferably is non-polar. Examples of suitable dispersing liquids are hydrocarbons such as acyclic aliphatic hydrocarbons such as n-pentane, n-hexane, n-heptane and n-octane; cyclic hydrocarbons such as cyclohexane, methyl cyclohexane; aromatic hydrocarbons such as xylene and toluene. Preferred are acyclic aliphatic hydrocarbons. The liquid hydrocarbon may be a mixture of such materials and would include such commercially available products as mineral spirits and solvent naphtha. A portion of the liquid hydrocarbon, i.e., 50 percent or less, can contain a polar solvent such as a ketone or ester. However, the use of polar solvents must be with care because of the tendency of the reaction mixture to form a macrogel instead of discrete polymeric microparticles.

Examples of organic polyisocyanates are aliphatic including cycloaliphatic and aromatic polyisocyanates or mixed aromatic-aliphatic polyisocyanates. Examples of suitable organic polyisocyanates are 2,4-toluene diisocyanate and mixtures of 2,4- and 2,6-toluene diisocyanate, hexamethylene diisocyanate, diphenylmethane-4,4'-diisocyanate, 4,4'-methylene-bis(cyclohexylisocyanate), isophorone diisocyanate and mixtures thereof. Also, higher polyisocyanates such as the trimer of isophorone diisocyanate available from Veba Chemie as T-1890 and the biuret formed from 1,6-hexane diisocyanate and water at a molar ratio of 3:1 available from Mobay Company as DESMODUR N may be used.

The polyol component can comprise one or more polyols, one of which may be a polymeric polyol. Preferably, the polymeric polyol contains a segment which is not solvated by the liquid hydrocarbon. Examples of suitable polymeric polyols are polyether polyols, acrylic polyols, and polyester polyols, with the polyester polyols being preferred. Preferably, the polymeric polyol is a diol.

Examples of polyether polyols are polyalkylene ether polyols which include those having the following structural formula:

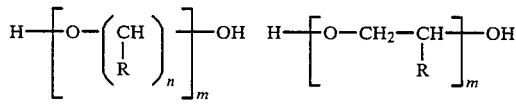

where the substituent R is selected from the class consisting of hydrogen and lower alkyl containing from 1 to 2 carbon atoms including mixed substituents, and n is typically from 2 to 6 and m is from 10 to 100 or even higher. Included are poly(oxytetramethylene)glycols, poly(oxyethylene)glycols, poly(oxy-1,2-propylene)-glycols and the reaction products of ethylene glycol with a mixture of 1,2-propylene oxide and ethylene oxide.

Examples of acrylic polymers are interpolymers of about 0.2 to 50 percent by weight hydroxy-containing vinyl monomers such as hydroxyalkyl acrylate and methacrylate having 2 to 6 carbon atoms in the alkyl group and 50 to 99.8 percent by weight of other ethylenically unsaturated copolymerizable materials such as alkyl acrylates and methacrylates; the percentages by weight being based on the total weight of the monomeric charge.

Examples of suitable hydroxyalkyl acrylates and methacrylates are acrylic acid and methacrylic acid esters of ethylene glycol and propylene glycol.

Examples of suitable alkyl acrylates and methacrylates are ethyl acrylate and methyl methacrylate.

Besides alkyl acrylates and methacrylates, other copolymerizable ethylenically unsaturated monomers which can be polymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Examples of polyester polyols are those prepared by the polyesterification of an organic polyol and/or an epoxide with an organic polycarboxylic acid or anhydride.

Examples of organic polyols are monomeric acyclic, and cyclic polyols, including aliphatic, cycloaliphatic and aromatic polyols containing 2 to 20 carbon atoms. Diols are preferred. Included are alkylene glycols, such as ethylene glycol, neopentyl glycol and glycols such as hydrogenated bisphenol A, cyclohexanediol, and cyclohexanedimethanol. Examples of higher functionality polyols are trimethylolpropane, trimethylolethane, pentaerytyritol and the like. Examples of epoxides are alkylene oxides such as ethylene oxide and propylene oxide, glycidyl ethers such as butyl glycidyl ether.

The acid component of the polyester consists primarily of monomeric carboxylic acids or anhydrides having 2 to 18 carbon atoms per molecule. Examples are acyclic and cyclic polycarboxylic acids including aliphatic, cycloaliphatic and aromatic polycarboxylic acids. Dicarboxylic acids are preferred. Among the acids which are useful are phthalic acid, isophthalic acid, terephthalic acid, tetrahydrophthalic acid, hexahydrophthalic acid, adipic acid, azelaic acid, sebacic acid, and glutaric acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as methyl esters can be used.

Besides polyester polyols formed from polybasic acids and polyols, polylactone-type polyesters can also be employed. These products are formed from the reaction of a lactone such as epsilon-caprolactone and a polyol. Such products are described in U.S. Pat. No. 3,169,945 to Hostettler, and the portion of this patent relating to the description of polycaprolactone polyols being incorporated by reference. Typically, the polymeric polyol has a number average molecular weight of at least 500, usually within the range of 500 to 10,000.

Besides the polymeric polyol, the polyol component preferably contains a low molecular weight polyol, that is, a polyol having a molecular weight below 250. Preferably, a low molecular weight diol is employed. Examples of such polyols include acyclic and cyclic polyols containing up to 12 carbon atoms. Examples of such low molecular weight polyols include alicyclic, aliphatic glycols such as ethylene glycol, propylene glycol, 1,4-butanediol and cycloaliphatic diols such as 1,2-cyclohexanediol and cyclohexanedimethanol. Triols such as trimethylolpropane can also be used.

As mentioned above, the polyol component contains segments which are not solvated by the liquid hydrocarbon as well as segments which are solvated by the liquid hydrocarbon. The ether, ester and polymerized acrylic ester groups such as polymerized methyl methacrylate groups in the above-mentioned polymeric polyols provide the segments which are not solvated by the liquid hydrocarbon. Also, the urethane linkages derived from reaction with the polyisocyanate provide segments which are not solvated by the liquid hydrocarbon.

With regard to solvatable segment, it is preferably an acyclic hydrocarbon chain of greater than 10, more preferably at least 18 carbon atoms. Preferably, the hydrocarbon chain is pendant. By pendant chain is meant a chain which is attached at one end only by a co-valent bond to the remainder of the molecule which contains the solvatable segment. The solvatable segment can be present in the polymeric polyol mentioned above or it can be present in yet another polyol. When solvatable segment is incorporated into the polymeric polyol, it is preferably pendant from the polymer backbone. In the case of acrylic polyols, this is accomplished by the use of a co-polymerizable monomer such as lauryl methacrylate or stearyl methacrylate with the lauryl and stearyl groups being the solvatable segment. In the case of a polyester polyol, the use of a fatty monocarboxylic acid such as lauric acid and stearic acid, as well as unsaturated fatty acids such as oleic acid and linoleic acid, may be used in admixture with other polycarboxylic acids. However, when monocarboxylic acids are used in this way, the amounts used must be relatively low compared to the polycarboxylic acids. Alternately, fatty monocarboxylic acids may be condensed with polyols such as trimethylolpropane, pentaerythritol or sucrose to form a polyol containing fatty acid moieties which can be used per se or condensed along with the other polycarboxylic acids and polyols to form the polyester. The solvatable segment can also be in the polymer backbone which can be accomplished by using dimer acid.

Also, a material containing a solvatable segment such as hydroxystearic acid or poly-12-hydroxystearic acid can be reacted with a polyepoxide such as diglycidyl ether of 1,4-butanediol or the diglycidyl ether of bisphenol A to produce a polyol which contains the solvatable segment. Preferably, poly-12-hydroxystearic acid, i.e., dimers or higher self-condensed polymers having a number average molecular weight of 582 to about 5000, are used.

The degree to which the segment is solvatable depends, of course, on the polarity of the segment relative to that of the liquid hydrocarbon. This can be determined by the solubility of the material itself containing the solvatable segment, i.e., the solubility of stearyl methacrylate used in preparing an acrylic polyol; the solubility of stearic acid or dimer acid used in preparing a polyester; and the solubility of the poly-12-hydroxystearic acid used in the preparation of adducts with polyepoxides. Materials which are soluble in the liquid hydrocarbon themselves provide segments which are solvatable. With regard to the degree of solubility, complete solubility in the liquid hydrocarbon is not required and partial solubility as evidenced by a slightly cloudy product is acceptable.

Preferably, the solvatable segment comprises at least 15 percent, more preferably from about 15 to 50 percent of the polymeric microparticle, the percentage by weight being determined by dividing the weight of the material containing the solvatable segment by the total weight of reactants used in preparing the polymeric microparticle.

The polyol component and the polyisocyanate are reacted together with stirring preferably in organic solvent such as toluene and methyl isobutyl ketone to form the NCO-prepolymer. The prepolymer can be prepared by techniques well known in the art. For example, the polyisocyanate is usually first charged to a suitable reaction vessel followed by the polyol component and the mixture may then be heated if necessary. If desired, catalysts such as dibutyltin dilaurate, stannous octoate and the like can be employed to accelerate the reaction.

After the NCO-prepolymer has been prepared, it is dispersed in the liquid hydrocarbon and reacted with an active hydrogen-containing material having an average active hydrogen functionality of 2 or more, i.e., chain extender. Reaction is conducted to form a polymer in microparticulate form, i.e., dispersed particles, on the order of 0.001 to 10 microns as determined by examination with electron microscope.

Examples of suitable chain extenders are polyols, polyamines and aminoalcohols including mixtures thereof, with mixtures of diols and higher functionality polyols being preferred. Specific examples of polyols include diols such as ethylene glycol and 1,4-butanediol. Examples of polyols having a functionality greater than 2 include glycerine, trimethylolpropane, and pentaerythritol.

Specific examples of polyamines having a functionality of 2 or more are ethylene diamine, isophorone diamine, diethylenetriamine, triethylenetetramine, tetraethylene pentamine, pentaethylene hexamine, triisopropylene-1,2-tetramine and bis-(3-amino-propyl)amine, including mixtures thereof. Also, hydrazine and substituted hydrazines such as methyl hydrazine, ethyl hydrazine and phenyl hydrazine may be used alone or in admixture with one another or with the amines mentioned above.

Examples of aminoalcohols are N-aminoethylethanolamine, ethanolamine, diethanolamine and aminopropyl alcohol.

The amount of chain extender which is used depends on the NCO content of the prepolymer and the reactivity and functionality of the active hydrogen-containing material. In general, the equivalent ratio of active hydrogens to NCO groups should be in the range of about 0.6 to 1.8:1, preferably 0.8 to 1.2:1.

For reaction with a chain extender, the NCO-prepolymer is dispersed in the liquid hydrocarbon and reacted in a dispersed form with the chain extender. The NCO-prepolymer can be dispersed in a number of ways. The prepolymer can be added incrementally to the dispersing medium with good agitation. Alternately, the dispersion medium can be added incrementally to the prepolymer with good agitation. The chain extender can be subsequently added to the dispersion or alternately it can be first added to the liquid hydrocarbon before dispersion of the prepolymer.

Reaction of the NCO-prepolymer with the chain extender can proceed at room temperature or at a higher temperature, usually up to about 100° C., depending upon the reactivity of the various reactants, the presence or absence of catalyst and the speed of reaction. The time of reaction can vary but will be sufficient to obtain a product in microparticulate form. Usually, the time of the crosslinking reaction is from about 1 minute to 5 hours.

The concentration of the reactants in the dispersed phase is usually about 10 to 50 percent by weight based on total weight of the dispersion. At the completion of the crosslinking reaction, the solids content may be increased somewhat by removal of the organic liquid without loss of dispersion stability.

Depending on the functionality of the NCO-prepolymer and the chain extender, the dispersions of the present invention may contain crosslinked polymeric microparticles and it is preferred that a portion of the microparticles be crosslinked. The presence of crosslinked microparticles in the dispersion is determined in an indirect manner, by reacting the same reactants in the absence of organic liquid. If a solid gelled mass forms, then it is believed the dispersion contains crosslinked polymeric microparticles. Also, the polymeric microparticles are preferably amorphous. Microparticles which are crosslinked and amorphous provide the test control of rheology when the microparticles are incorporated into coating compositions.

The polymeric microparticle dispersions prepared as described above can be incorporated into coating compositions such as organic solvent-based coating compositions by simply mixing the dispersion with a coating composition. Alternately, the microparticles could be separated from the dispersion by spray drying, filtering, coagulating and filtering, dried and mixed into the coating composition.

The polymeric microparticles are useful as rheology modifiers in coating compositions. For this use, the microparticles are combined with film-forming polymers, usually solution polymers. The film-forming polymer is usually in a dissolved form in the coating composition and the microparticles are dispersed in the coating composition.

The amount of polymeric microparticle solids which is present in the coating composition is generally from about 1 to 80 percent by weight, preferably from about 3 to 50, more preferably 5 to 30 percent by weight, based on weight of resin solids.

The use of the polymeric microparticles is particularly desirable for use with coating compositions based on condensation polymers such as polyesters and polyurethanes, particularly in high solids coating compositions, that is, coating compositions which have a total solids content of about 40 to 80 percent by weight. The microparticles have been found to provide particularly good sag resistance to such high solids coating compositions. The polymeric microparticles can be used in lower solids coating compositions, for example, benefits could be obtained in coating compositions having solids contents of at least 30 percent by weight.

The polymeric microparticles are particularly useful in coating compositions containing metallic pigmentation such as copper, bronze and aluminum flake, in that the microparticles result in proper orientation of the pigment, resulting in a lustrous shiny appearance with good flop, distinctness of image and high gloss. By flop is meant the visual change in brightness or lightness of metallic coating with a change in the viewing angle, that is, a change from 180 to 90 degrees. The greater the change, the better the flop. Flop is important because it accentuates the lines of a curved surface such as an automobile body. Besides metallic pigmentation, the coating composition may contain non-metallic pigments such as titanium oxide, chromium oxide, lead oxide and carbon black, organic pigments such as phthalocyanine blue. When used, pigments constitute from 1 to 50 percent by weight of coating solids. Where metallic pigments are used, they are used in amounts of about 1 to 25 percent by weight of coating solids.

If desired, the coating composition may additionally incorporate other additives such as U.V. light stabilizers and catalyst. Also, the acrylic microparticles such as described in U.S. Pat. No. 4,147,688 can be used in the coating composition along with the polymeric microparticles of the present invention. When used, the weight ratio of the polymeric microparticles of the present invention to the acrylic microparticles can be from 0.25 to 5:1, with the total amount of microparticle solids being from about 1 to 80, preferably 3 to 50, more preferably 5 to 30 percent by weight based on resin solids weight.

The coating compositions containing the polymeric microparticles can be applied to various substrates to which they adhere to form coated articles. The compositions herein can be applied by any conventional method, including brushing, dipping, flow coating, electrostatic spraying, and the like, but they are most often applied by air spraying. The usual spray techniques and equipment are utilized. The coatings of the present invention can be applied over virtually any substrate, including wood, metals, glass, cloth, plastics, foam and the like, as well as over various primers.

Besides one-coat applications, the coating composition containing the polymeric microparticles can be used in clear-over-color applications. In these applications, a pigmented or colored basecoat is adhered to the substrate or to a primed substrate to form a basecoat and a clear coating is adhered to the basecoat. The polymeric microparticles may be in the basecoat, the clear coat or both the basecoat and clear coat.

Examples of coating compositions suitable for use with the microgel of the present invention are those described in U.S. Pat. Nos. 4,025,474; 4,055,607; 4,115,472; 4,180,489; 4,242,384; 4,268,547; 4,220,679 and 4,290,932. As mentioned above, coating compositions based on condensation polymers such as polyesters and polyurethanes are preferred.

The invention is illustrated by, but not limited to, the following examples in which parts and percentages are by weight unless otherwise indicated. Throughout the specification, all parts are by weight unless otherwise indicated.

EXAMPLES

The following examples show the preparation of various polyurethane dispersions and the evaluation of these dispersions in coating compositions. The polyurethane microparticles were prepared by reacting an NCO-prepolymer with a polyfunctional active hydrogen-containing compound in an organic liquid via dispersion polymerization techniques.

EXAMPLE I

In this example, an NCO-prepolymer was prepared from reacting an adduct of polyhydroxystearic acid and 1,4-butanediol diglycidyl ether, a polycaprolactone diol, dimethylolpropionic acid and 4,4'-methylene-bis(-cyclohexylisocyanate). The NCO-prepolymer was reacted in dispersed form with diethylene triamine. The resulting dispersion of poly(ureaurethane) microparticles was then incorporated into an aminoplast-curable polyester coating composition.

The NCO-prepolymer was prepared by first charging the following ingredients to a reaction vessel equipped with a stirrer, heating mantle and condenser:

| Ingredients | Parts by Weight (in grams) |
| --- | --- |
| Adduct of poly-12-hydroxystearic acid and 1,4-butanediol diglycidyl ether[1] | 98.1 |
| PCP-0230[2] | 387.2 |
| Dimethylolpropionic acid | 12.2 |
| DESMODUR W[3] | 283.7 |
| Methyl isobutyl ketone | 278.8 |

[1]Adduct prepared by heating hydroxystearic acid in the presence of dibutyltin oxide to an acid value of about 29. The resulting poly-12-hydroxystearic acid (1650 grams) was condensed with 108.4 grams of 1,4-butanediol diglycidyl ether by heating in the presence of 1.8 grams of benzyldimethylamine catalyst to an acid value of about 1.4.
[2]Polycaprolactone diol having a molecular weight of about 1250 obtained from Union Carbide Corportation.
[3]4,4'-methylene-bis(cyclohexylisocyanate)obtained from Mobay Company.

The ingredients were heated with stirring to 40° C., dibutyltin dilaurate (1.1 grams) added and the reaction mixture began to exotherm. The heat was removed and the reaction continued to exotherm with the peak temperature reaching 110° C. The reaction temperature was maintained with stirring between 90°–100° C. until an NCO equivalent of about 1350 was obtained.

The NCO-prepolymer (300 grams) was dispersed with stirring into 293 grams of mineral spirits. The resultant dispersion was added with stirring to 6.4 grams of diethylenetriamine dissolved in 52.3 grams of mineral spirits and 41.4 grams of methyl isobutyl ketone. After the addition was completed, the reaction mixture was filtered and stored in a glass jar at ambient temperature. A stable non-aqueous dispersion of poly(urea-urethane) particles having a viscosity of about 40 centipoises was formed.

The dispersion was then incorporated into a coating composition as follows:

| Ingredients | Parts by Weight (in grams) |
| --- | --- |
| Butyl acetate | 20 |
| TINUVIN 328[1] | 2 |
| CAB[2] | 4 |
| Poly(urea-urethane) dispersion[3] | 43 |
| CYMEL 303[4] | 40 |
| Polyester[5] | 51 |
| Catalyst[6] | 0.5 |
| Pigment paste[7] | 22 |

[1]UV light stabilizer, substituted benzotriazole, obtained from Ciba Geigy Corporation.
[2]Cellulose acetate butyrate 25 percent by weight solution in a 75/25 volume mixture of methyl isobutyl ketone and 1-butanol.
[3]Poly(urea-urethane) dispersion prepared as described above and thinned with an equal volume of 2-hexoxyethanol.
[4]Hexakis(methoxymethylol)melamine obtained from American Cyanamid Company.
[5]Polyester formed from condensing neopentyl glycol and hexahydrophthalic anhydride having a number average molecular weight of about 344 and present as a 91 percent resin solids solution.
[6]40 percent by weight para-toluenesulfonic acid in isopropanol.
[7]Pigment paste containing aluminum pigment phthalo blue, irgazin blue and carbon black in an iminized polyester pigment grinding vehicle. The paste contained 18 percent by weight pigment and 27 percent by weight resin.

The coating composition formulated as described above was sprayed onto primed steel panels at a dry film thickness of about 1.7 to 2.0 mils and the coating cured at 250° F. (121° C.) for about 30 minutes while the coated panel was at an angle of 45° from the horizontal. The coating showed excellent sag resistance and the cured coating had good flop. The coating compositions containing the polymeric microparticles were compared to similar coating compositions but which contained acrylic microparticles as described in Example 2 of U.S. Pat. No. 4,147,688 and to similar coating compositions but which contained no added microparticles. The coating compositions containing the poly(urea-urethane) microparticles had better sag resistance than the coating compositions containing the acrylic microparticles. The coating compositions containing no added microparticles sagged badly when cured under the conditions described above.

EXAMPLE II

This example is similar to that of Example I with the exception that the NCO-prepolymer was dispersed by adding it to n-heptane.

The NCO-prepolymer was prepared from the following ingredients using the procedure as generally described in Example I.

| Ingredients | Parts by Weight (in grams) |
| --- | --- |
| Poly-12-hydroxystearic acid-butanediol diglycidyl ether adduct prepared as generally described in Example I | 320.9 |
| PCP-0230 | 627.3 |
| Dimethylolpropionic acid | 19.8 |
| DESMODUR W | 386.7 |
| Methyl isobutyl ketone | 451.7 |
| Dibutyltin dilaurate | 1.8 |

The resulting NCO-prepolymer had an NCO equivalent of 1302.

The NCO-prepolymer (1620 grams) were dispersed with stirring in 1582.2 grams of n-heptane. To 1000 grams of the dispersion was added with stirring 13.4 grams of diethylenetriamine dissolved in a mixture of 88.2 grams of n-heptane and 57.3 grams of methyl isobutyl ketone. After addition was complete, the mixture was filtered and stored in a glass jar. A stable non-aqueous dispersion of poly(urea-urethane) particles having a viscosity of about 40 centipoises was formed. The dispersion was then incorporated into a coating composition as follows:

| Ingredients | Parts by Weight (in grams) |
|---|---|
| Butyl acetate | 42 |
| TINUVIN 328 | 2 |
| CAB as described in Example I | 4 |
| Poly(urea-urethane) dispersion prepared as described immediately above | 21 |
| CYMEL 303 | 40 |
| Polyester as described in Example I | 51 |
| Catalyst as described in Example I | 0.5 |
| Pigment paste as described in Example I | 22 |

When the coating composition was sprayed onto steel panels and cured as described in Example I, the coating showed excellent sag resistance and good flop. Also, the gloss of the cured coating was somewhat better than that prepared in accordance with Example I.

EXAMPLE III

This example is similar to Example I above with the exception that isophorone diamine was used in place of diethylenetriamine.

The NCO-prepolymer was prepared from the following ingredients using the procedure as generally described in Example I.

| Ingredients | Parts by Weight (in grams) |
|---|---|
| Poly-12-hydroxystearic acid-butanediol diglycidyl ether adduct prepared as generally described in Example I | 123.5 |
| PCP-0230 | 241.5 |
| Dimethylolpropionic acid | 7.7 |
| DESMODUR W | 148.9 |
| Toluene | 174.0 |
| Dibutyltin dilaurate | 0.7 |

The resulting NCO-prepolymer had an NCO equivalent of 1359.

The NCO-prepolymer (600 grams) was mixed with 900 grams of n-heptane by slowly adding the heptane to the prepolymer with stirring. After completion of the heptane addition, 39.2 grams of isophorone diamine dissolved in 392 grams of heptane was slowly added with stirring. After addition was complete, the reaction mixture was filtered and stored in a glass jar. A dispersion of poly(urea-urethane) particles having a viscosity of about 40 centipoises was formed. The dispersion was incorporated into a coating composition as follows:

| Ingredients | Parts by Weight (in grams) |
|---|---|
| Butyl acetate | 34 |
| TINUVIN 328 | 2 |
| CAB as described in Example I | 4 |
| Poly(urea-urethane) dispersion as prepared above | 20 |
| CYMEL 303 | 40 |
| Polyester as described in Example I | 54 |
| Catalyst as described in Example I | 0.5 |
| Pigment paste[1] | 19 |

[1]The pigment paste contained aluminum pigment, phthalo blue and carbon black in an iminized polyester pigment grinding vehicle. The paste contained 21.1 percent by weight pigment and 28.1 percent by weight resin.

When the coating composition was sprayed onto steel panels and cured as described in Example I, the coating had excellent sag resistance and good flop. The cured coating had a 20° gloss of 73.

EXAMPLE IV

This example is similar to Example III above with the exception that a mixture of diethylenetriamine and isophorone diamine (25/75 equivalent ratio) was used instead of isophorone diamine.

The NCO-prepolymer was prepared from the following ingredients using the procedure generally described in Example I.

| Ingredients | Parts by Weight (in grams) |
|---|---|
| Poly-12-hydroxystearic acid-butanediol diglycidyl ether adduct prepared as generally described in Example I | 3035.8 |
| PCP-0230 | 5934.0 |
| Dimethylolpropionic acid | 189.2 |
| DESMODUR W | 3059.3 |
| Toluene | 4274.2 |
| Dibutyltin dilaurate | 17.2 |

The resulting prepolymer had an NCO equivalent of about 1360.

Normal heptane (7500 grams) was slowly added with stirring to 5000 grams of the NCO-prepolymer to form a dispersion. To 250 grams of this dispersion were added with stirring 5.25 grams of isophorone diamine and 0.71 grams of diethylenetriamine dissolved in 53.64 grams of toluene. After addition was complete, the reaction mixture was stored in a glass jar. A dispersion of poly(urea-urethane) particles having a viscosity of about 40 centipoises was formed.

The dispersion was then incorporated into a coating composition as follows:

| Ingredients | Parts by Weight (in grams) |
|---|---|
| Butyl acetate | 29 |
| TINUVIN 328 | 2 |
| CAB as described in Example I | 4 |
| Poly(urea-urethane) dispersion prepared as described above | 27 |
| RESIMINE 745[1] | 40 |
| Polyester as described in Example I | 52 |
| Catalyst as described in Example I | 0.5 |
| Pigment paste as described in Example III | 19 |

[1]Hexakis(methoxymethylol)melamine obtained from Monsanto Company.

When the coating composition was sprayed onto steel panels and cured as described in Example I, the coating showed excellent sag resistance and good flop.

EXAMPLE V

This example was similar to Example IV with the exception that JEFFAMINE T-403 (a trifunctional polyamine obtained from Jefferson Chemical Co., MW of about 400) was used in place of the isophorone diamine and diethylenetriamine. An NCO-prepolymer was prepared as described above in Example IV. After dispersion of the prepolymer in n-heptane, the JEFFAMINE T-403 (9.5 grams) dissolved in 72.2 grams of toluene was added slowly with stirring to 200 grams of the n-heptane dispersion. The reaction mixture was then filtered and stored in a glass jar. A dispersion of poly(urea-urethane) particles having a viscosity of about 40 centipoises was formed. The poly(urea-urethane) dispersion prepared as described above was then incorporated into a coating composition as follows:

| Ingredients | Parts by Weight (in grams) |
|---|---|
| Butyl acetate | 27 |
| TINUVIN 328 | 2 |
| CAB as described in Example I | 4 |
| Poly(urea-urethane) dispersion prepared as described above | 29 |
| RESIMINE 745 | 40 |
| Polyester as described in Example I | 52 |
| Catalyst as described in Example I | 0.5 |
| Pigment paste as described in Example III | 19 |

When the coating composition was sprayed onto steel panels and cured as described in Example I, the coating showed excellent sag resistance and good flop.

EXAMPLE VI

This example is similar to that of Example IV with the exception that a mixture of 1,4-butanediol/glycerine was used in place of the diethylenetriamine/isophorone diamine.

An NCO-prepolymer dispersion was prepared as described above in Example IV.

Two hundred (200) grams of the prepolymer were mixed with 5.37 grams of 1,4-butanediol and 0.849 grams of glycerine. To this mixture was then stirred in 203.6 grams of n-heptane. The dispersion was then heated to 80° C. until IR analysis of the reaction mixture indicated the disappearance of NCO groups. The resulting dispersion of polyurethane microparticles was stored in a glass jar.

The polyurethane dispersion was then formulated into a coating composition as follows:

| Ingredients | Parts by Weight (in grams) |
|---|---|
| TINUVIN 328 | 3 |
| Solvent blend[1] | 82 |
| Polyurethane dispersion as described above | 30 |
| CYMEL 1130[2] | 35 |
| Polyester as described in Example I | 19 |
| Polyurethane[3] | 29 |
| Polyurethane[4] | 10 |
| Pigment paste[5] | 43 |
| Catalyst[6] | 2 |

[1]Solvent blend of 2-ethoxyethylacetate/methyl isobutyl ketone/n-propanol in a 1/1/0.5 volume ratio.
[2]Mixed methylated, butylated melamine-formaldehyde resin obtained from American Cyanamid Company.
[3]Poly(ester-urethane) polyol obtained from condensing isophorone diisocyanate with dimethylolpropionic acid, diethylene glycol and epsilon-caprolactone; molecular weight of about 6000 as described generally in Example C of U.S. Pat. No. 4,410,667.
[4]Poly(ester-urethane) polyol formed from condensing 4,4'-methylene-bis-(cyclohexylisocyanate) with polycaprolactone polyol (molecular weight 1250), dimethylolpropionic acid and monoethanolamine, molecular weight about 19,000, as generally described in Example B of U.S. Pat. No. 4,410,667.
[5]Pigment paste was prepared by grinding aluminum flake in an iminized polyester grinding vehicle. The paste contained 24 percent by weight pigment and 29 percent by weight resin.
[6]Catalyst was dinonyl naphthalene disulfonic acid, 50 percent neutralized with diisopropanolamine, used a 30 percent by weight solution.

When the coating composition was sprayed onto steel panels and cured as described in Example I, the coating showed good gloss, flop and sag resistance.

We claim:

1. A dispersion of polymer microparticles in a liquid hydrocarbon, characterized in that the polymer is prepared by reacting in dispersed form a preformed NCO-prepolymer which is formed from reacting an organic polyisocyanate with a polyol mixture comprising a polymeric polyol which contains a segment which is not solvated by the hydrocarbon and a second polyol which contains a segment solvated by the hydrocarbon, said second polyol being formed from reacting poly-12-hydroxystearic acid with a polyepoxide, with an active hydrogen-containing compound having a functionality of at least 2 to form the polymer microparticles dispersed in the liquid hydrocarbon.

2. The dispersion of claim 1 in which the liquid hydrocarbon is an aliphatic hydrocarbon.

3. The dispersion of claim 1 in which the NCO-prepolymer is formed from reacting a polymeric polyol component with an equivalent excess of an organic polyisocyanate.

4. The dispersion of claim 3 in which the NCO:active hydrogen equivalent ratio is about 2:1.

5. The dispersion of claim 1 in which the polymeric polyol which contains a segment which is not solvated by the hydrocarbon is a polyester polyol.

6. The dispersion of claim 5 in which the polyester polyol has a number average molecular weight within the range of about 500 to 4000.

7. The dispersion of claim 6 in which the polyester polyol is a polycaprolactone polyol.

8. The dispersion of claim 3 in which the polyol mixture also contains a diol having a molecular weight less than 250.

9. The dispersion of claim 8 in which the polyol mixture also contains a diol and a higher functionality polyol.

10. A polymer in particulate form which is prepared by:
   (A) reacting a preformed NCO-prepolymer in dispersed form in a liquid hydrocarbon with an active hydrogen-containing compound having a functionality of at least 2 to form polymer microparticles dispersed in the liquid hydrocarbon; said NCO-prepolymer being formed from reacting an organic polyisocyanate with a polyol mixture comprising a polymeric polyol which contains a segment which is not solvated by the hydrocarbon and a second polyol which contains a segment solvated by the hydrocarbon; said second polyol being formed from reacting poly-12-hydroxystearic acid with a polyepoxide;
   (B) separating the polymer microparticles from the liquid hydrocarbon.

11. The polymer of claim 10 in which the polymeric polyol which contains a segment which is not solvated by the hydrocarbon is a polyester polyol.

12. A coating composition comprising a film-forming polymer in combination with the polymeric microparticles prepared in accordance with claim 1.

13. A coating composition comprising a film-forming polymer in combination with the polymeric microparticles prepared in accordance with claim 3.

14. A coating composition comprising a film-forming polymer in combination with the polymeric microparticles prepared in accordance with claim 5.

15. The coating composition of claim 12 in which the film-forming polymer comprises a polymeric polyol selected from the class consisting of polyesters and polyurethanes.

16. A coated article comprising a substrate and adhered thereto a cured coating composition in accordance with claim 12.

17. A multi-layered coated article comprising a substrate and the cured coating composition of claim 12 adhered thereto as a basecoat and a cured transparent topcoat adhered to the basecoat.

18. A coated article of claim 17 in which the basecoat contains metallic pigmentation.

19. The dispersion of claim 1 in which the polymeric microparticles are in combination with acrylic polymeric microparticles.

* * * * *